United States Patent

Strover et al.

[11] Patent Number: 5,967,790
[45] Date of Patent: Oct. 19, 1999

[54] SURGICAL MODEL

[75] Inventors: Sheila Margaret Strover, St Agnes; Angus Everett Strover, Droitwich, both of United Kingdom

[73] Assignee: United Surgical Services Limited, United Kingdom

[21] Appl. No.: 09/142,404
[22] PCT Filed: Mar. 6, 1997
[86] PCT No.: PCT/GB97/00611
§ 371 Date: Nov. 6, 1998
§ 102(e) Date: Nov. 6, 1998
[87] PCT Pub. No.: WO97/33263
PCT Pub. Date: Sep. 12, 1997

[30] Foreign Application Priority Data

Mar. 6, 1996 [GB] United Kingdom .................... 9604739
Nov. 7, 1996 [GB] United Kingdom .................... 9623199

[51] Int. Cl.⁶ .................................................. G09B 23/30
[52] U.S. Cl. ............................................. 434/274; 434/267
[58] Field of Search .................................. 434/267, 262, 434/274, 275; 623/20, 39

[56] References Cited

U.S. PATENT DOCUMENTS

| | | | |
|---|---|---|---|
| 3,953,899 | 5/1976 | Charnley | 623/20 |
| 4,106,219 | 8/1978 | Schneider | 434/274 |
| 4,331,428 | 5/1982 | Chandler | 434/274 |
| 4,433,961 | 2/1984 | Chandler | 434/274 |
| 4,838,795 | 6/1989 | Draenert | 434/274 |
| 4,850,877 | 7/1989 | Mason | 434/274 |
| 4,867,686 | 9/1989 | Goldstein . | |
| 5,282,867 | 2/1994 | Mikhail | 623/20 |
| 5,634,904 | 6/1997 | Battenfield | 604/116 |
| 5,681,354 | 10/1997 | Eckhoff | 623/20 |

FOREIGN PATENT DOCUMENTS

| | | |
|---|---|---|
| 0181992 | 3/1985 | European Pat. Off. . |
| 3840473 | 6/1988 | Germany . |
| 2204175 | 11/1988 | United Kingdom . |
| 9530388 | 11/1995 | WIPO . |

OTHER PUBLICATIONS

International Search Report May 23, 1997.
United Kingdom Search Report Feb. 5, 1997.

*Primary Examiner*—Robert A. Hafer
*Assistant Examiner*—Kurt Fernstrom
*Attorney, Agent, or Firm*—Ira S. Dorman

[57] ABSTRACT

A surgical model in the form of a knee structure comprises a penetrable outer skin 35, an impermeable penetrable capsule 13 within the model, and penetrable packing material 37 around the capsule. The capsule 13 conforms internally to the general anatomy of the internal cavity of the knee and contains simulated joint components comprising femoral condyles 15 with a femoral notch 16 therebetween, medial and lateral menisci 25 and 27, anterior and posterior cruciate ligaments 29 and 31 and tibial articular surfaces 32.

26 Claims, 4 Drawing Sheets

SURGICAL MODEL

The present invention relates to a surgical model, more particularly a model knee structure simulating certain aspects of the natural anatomical joint and capable of being prepared with realistic simulation of pathologies such as osteochondritis dissecans, osteoarthritis, chondral defects and flaps or loose bodies, for demonstrating and/or practising appropriate surgical techniques by arthroscopy, such as cutting, resecting, ligating, suturing and cauterising tissues in a realistic manner using endoscopic surgical instruments.

Surgical models for demonstrating and/or practising surgical techniques by arthroscopy are generally unrealistic. For example, existing models are often anatomically incorrect, at least insofar as the properties of the materials used for the models are concerned, are generally provided with pre-formed portals and are generally not watertight. These shortcomings give rise to significant difficulties in the training of surgeons in arthroscopic techniques in which, for example, the positioning of the portals and irrigation of the joint are particularly important.

For example, U.S. Pat. No. 4,433,961 describes a human knee model in which a bovine knee is modified to render its appearance more human-like and to facilitate access to the interior of the knee joint. The modified knee joint is encased in a synthetic fluid impervious cover to allow for continuous irrigation of the knee joint.

It is therefore an object of the present invention to provide a surgical model which eliminates or at least reduces these deficiencies of prior art models.

According to the present invention there is provided a surgical model in the form of a knee structure simulating certain aspects of the natural anatomical joint, the model comprising a penetrable outer skin and means defining simulated joint components comprising femoral condyles with a femoral notch therebetween, medial and lateral menisci, anterior and posterior cruciate ligaments and tibial articular surfaces wherein an impermeable penetrable capsule is provided within the skin and penetrable packing material is provided around the capsule between the capsule and the skin, the capsule being formed with internal protrusions corresponding to the femoral condyles with the femoral notch therebetween and corresponding to the tibial articular surfaces.

The model may be provided with a generally flat base or may be configured to be received in a cradle, which cradle is provided with a generally flat base. The base of the model or the cradle may be formed with a recess for engaging with a complementary protrusion formed on a receiving tray.

The model may include a simulated patellar complex intermediate the capsule and the skin. Penetrable packing material may be provided around at least a part of the simulated patellar complex. The patellar complex may incorporate a simulated patella, a simulated patellar tendon and may additionally incorporate a simulated tibial tubercle. The patellar complex may be made of a harder material than the skin and the capsule, for example a harder plastics material such as polyurethane. The patellar complex may allow removal of a part thereof to simulate a bone-tendon-bone graft.

The components simulating the femoral condyles with the femoral notch therebetween may be formed integrally with the capsule, for example they may be formed in the capsule wall. Components simulating one or more of the articular surface of the patella, plicae, the pes anserinus tendon, and the fat pad may be formed integrally with the capsule.

The components simulating the medial and lateral menisci, the anterior and posterior cruciate ligaments and the tibial articular surfaces may be formed as a separate assembly to the remainder of the capsule. The medial and lateral menisci may be formed as a first sub-assembly with one of the posterior and anterior cruciate ligaments, while the tibial articular surfaces may be formed as a second sub-assembly with the other of the posterior and anterior cruciate ligaments. The sub-assemblies may be interconnected by providing the first sub-assembly with a skirt which extends around the periphery of the second sub-assembly. Additionally, the second sub-assembly may be provided with a recess for receiving the cruciate ligament of the first sub-assembly. The free ends of the ligaments may be secured to the capsule within the femoral notch.

The capsule may be filled with a fluid such as water or saline, to simulate synovial fluid, which fluid may be pressurised, to simulate the conditions under which the appropriate arthroscopic technique would usually be conducted.

The width of the capsule is preferably such as to simulate para-condylar gutters, one at each side of the femoral condyles, into which loose pieces of articular joint material can fall to simulate a pathological loose body. Other pathologies may be simulated by cutting a joint surface to leave a loose chondral flap, abrading a joint surface to leave exposed bone, or a ligament and/or one or more menisci may be torn to simulate injury, all before enclosing the assembled joint members in the watertight capsule.

The skin of the model and the capsule may be formed of an elastomeric compound such as rubber, for example silicone rubber, or a colloid material, for example based on gelatine.

The packing material may comprise light discrete particulate material such as polystyrene beads or may comprise a moulded light material, for example expanded polystyrene, or may comprise the same material as the skin and/or the capsule.

The capsule and/or the skin may incorporate, or may be at least partly surrounded internally of the model by, a reinforcing material, such as a fibrous, mesh or gauze material.

For a better understanding of the present invention and to show more clearly how it may be carried into effect reference will now be made, by way of example, to the accompanying drawings in which.

The model knee joint shown in FIGS. 1 and 2 resembles in external appearance a human knee joint in flexion from about 100 mm above the patella to about 100 mm below it. The model is provided with a generally flat base which is positioned in use on a tray 1, for example of plastics material, which tray is provided with a protrusion 3 adapted to engage with a recess 5 in the underside of the model, which tray is itself provided with a downwardly extending recess 7 adapted to engage the edge of a table 9 or the like.

In this way, the model can be securely positioned for demonstrating techniques or instrumentation in arthroscopic surgery or arthroscopically assisted surgery.

Figure 1:
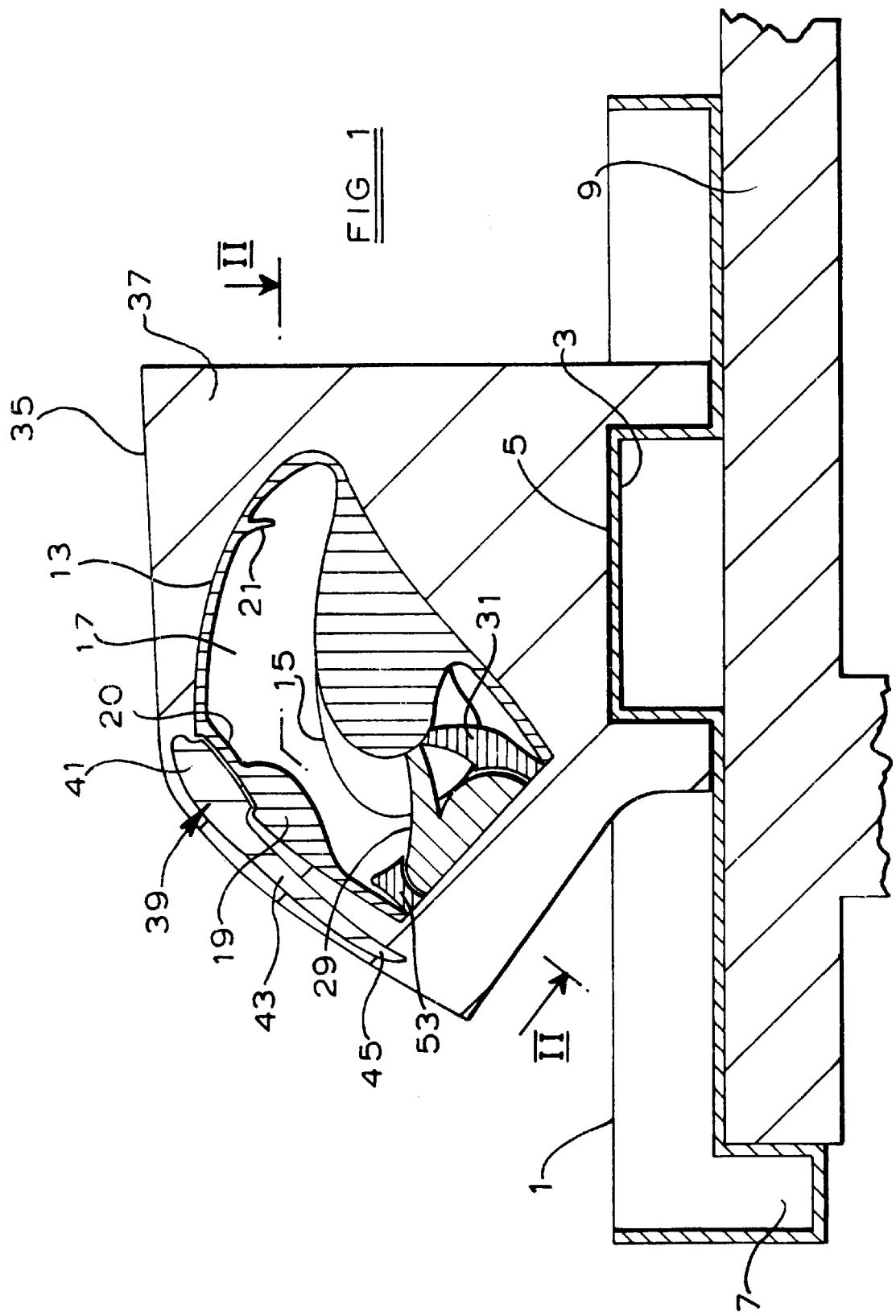
FIG. 1 is a cross-sectional view of one embodiment of a surgical model of a knee joint according to the present invention.
Figure 2:
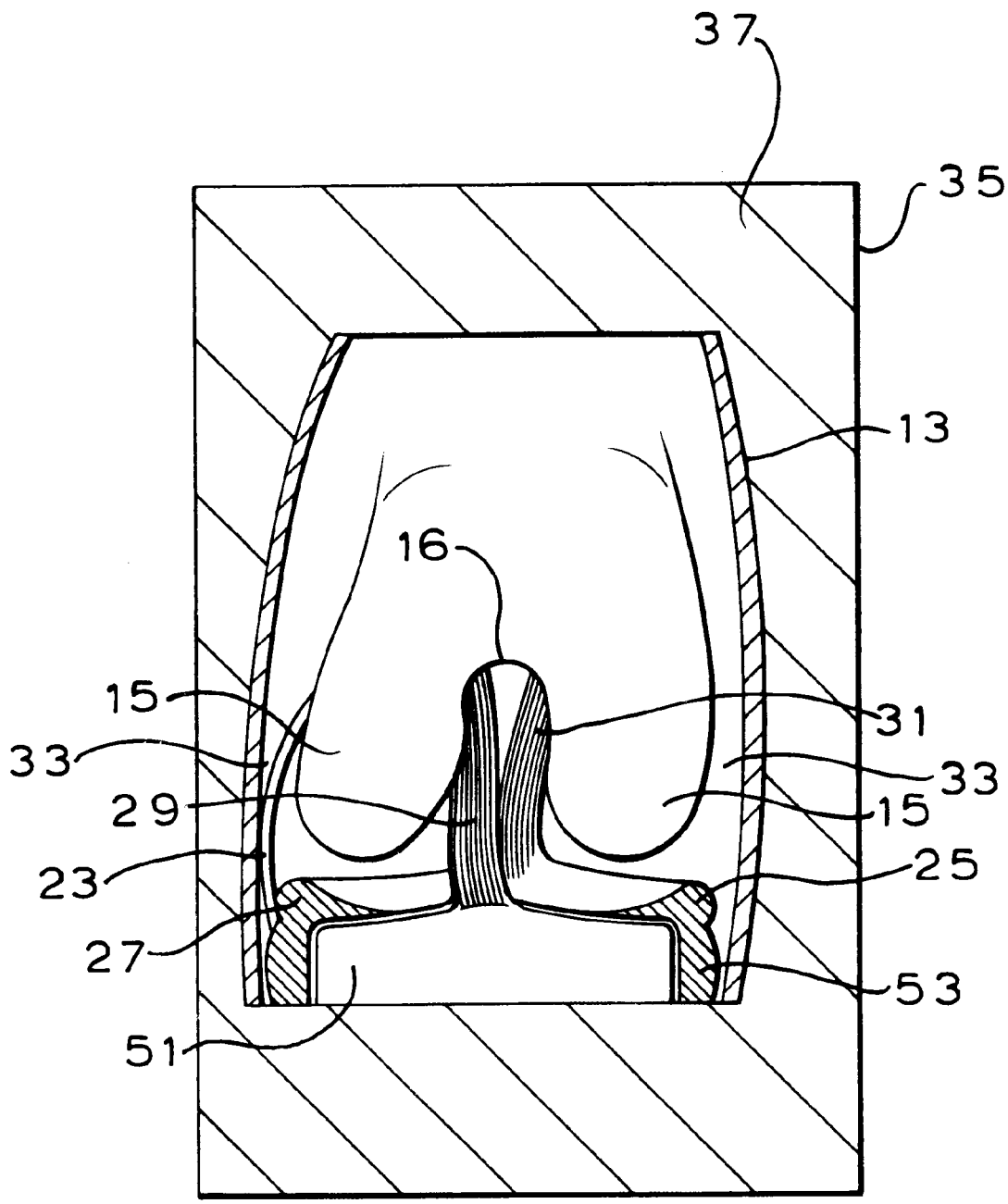
FIG. 2 is a sectional view along the line II—II shown in FIG. 1.
Figure 3:
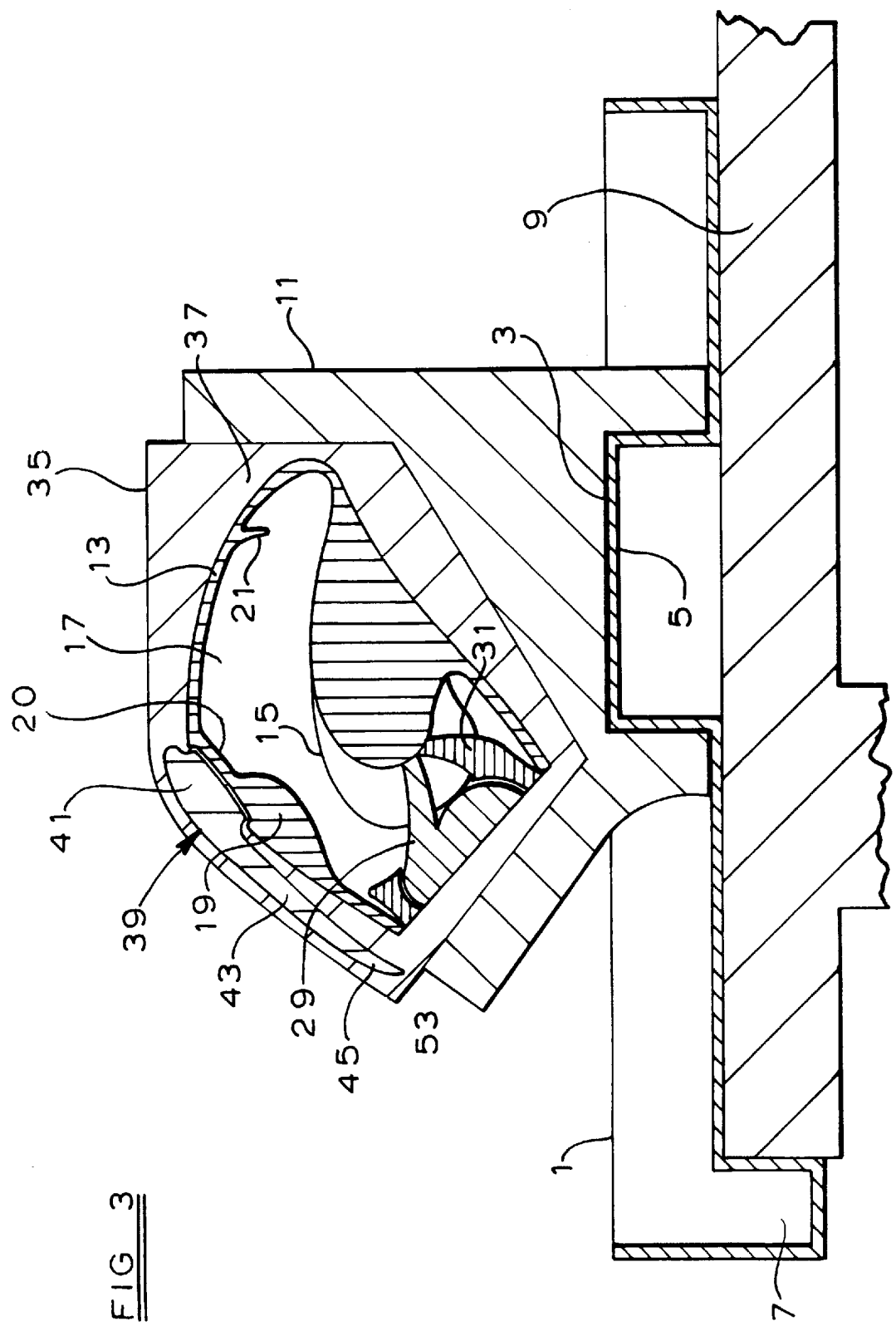
FIG. 3 is a cross-sectional view of an alternative embodiment of a surgical model of a knee joint according to the present invention.

The model knee shown in FIG. 3 is similar to that of FIGS. 1 and 2 except that the extent of the model has been reduced and a separate cradle 11 is provided in which the model is mounted. The embodiment of FIG. 3 has the advantage that the amount of material in the model, which has only limited life, is reduced, but has the disadvantage that it does not permit the use of a posterior portal.

The model in each of the embodiments of FIGS. 1 and 2 or 3 contains an internal watertight capsule 13 which conforms internally to the anatomy of the internal cavity of the knee when expanded by fluid under pressure. The capsule is formed with internal protrusions 15 conforming to the anatomy of the femoral condyles with the femoral notch 16 therebetween, the cavity extending around and behind the condyles. The capsule is also formed with a supra-patellar pouch 17 which extends proximally above the condyles. Additionally, a fat pad 19 is formed as an integral part of the capsule 13, together with the articular surface 20 of the patella, plicae 21 and the pes anserinus tendon 23.

Provided within the capsule, for example as a separate assembly, are medial and lateral menisci 25, 27 respectively, anterior and posterior cruciate ligaments 29, 31 respectively, and tibial articular surfaces 32. The proximal ends of the ligaments are secured within the femoral notch in an anatomically realistic manner, for example in recesses provided therein. Para-condylar gutters 33 extend below and to the side of the menisci.

The capsule may be filled with water or saline, to simulate synovial fluid, and the water or saline may be pressurised to simulate the conditions under which the appropriate arthroscopic technique would usually be conducted.

The capsule 13 is maintained in position within an outer skin surface 35 by means of a packing material 37. Also provided within the skin surface 35 and the capsule 13 is patellar complex 39 (the articular surface 20 thereof having been formed as part of the capsule itself). The patellar complex 39 is positioned beneath the skin surface and adjacent to the capsule and incorporates the patella 41 (other than the articular surface thereof), the patellar tendon 43 and a tibial tubercle 45.

Various pathologies can be simulated. For example, material may be deposited in the para-condylar gutters 33 to simulate a pathological loose body. Other pathologies may be simulated by cutting a joint surface to leave a loose chondral flap, abrading a joint surface to leave exposed bone, a ligament and/or one or more menisci may be torn to simulate injury. Additionally, the patellar complex may be made in a number of components to allow removal of part of the complex to simulate a bone-tendon-bone graft.

The material of the capsule 13 may be, for example, silicone rubber or a colloid material, such as one based on gelatine. The material may be suitably coloured to match the various anatomical features. For example the interior of the capsule may be generally pink, but may additionally include other colours, for example the fat pad may be yellow and other anatomical features may be white. Additionally, coloured fibres may be provided in the internal surface of the capsule to simulate blood vessels. The material of the skin surface 35 may also be of silicone rubber or colloid material. The packing material 37 may be a lightweight material such as polystyrene beads or expanded polystyrene block, but may alternatively be the same material as that of the skin, i.e. silicone rubber or colloid material. The patellar complex 39 is made of a harder material, for example a harder plastics material such as polyurethane in order to give a realistic impression to the surgeon when examining (palpating) the model prior to commencing an operation.

Silicone rubber material has the advantage of a long shelf-life, but it is not biodegradable. Colloid material has the advantage that it is biodegradable. Both silicone rubber and colloid material enable the surgeon to practise techniques in a realistic manner.

We have found there is no need for any form of clamping mechanism because of the weight of the model and because the material of the model has high frictional properties.

Thus the model is primarily concerned with the internal shape of the knee joint and not with other anatomical features, such as the shafts of bones, which are not visible through an arthroscope. However, the internal anatomy of the capsule is very realistic. The capsule, and the model, are watertight and pressure resistant and therefore allow realistic simulation of true operating conditions. Additionally, the model permits a surgeon to practise other procedures such as suturing of a meniscus, while the presence of the pes anserinus tendon gives the surgeon additional indications as to the location of the instruments within the model.

The model is manufactured by first providing a male mould corresponding to the configuration of the internal cavity of the knee when expanded by fluid under pressure, the mould incorporating recesses conforming to the anatomy of the femoral condyles together with recesses conforming to the anatomy of the fat pad, together with the articular surface of the patella, plicae and the pes anserinus tendon. The mould is supported at the lower end thereof.

Moulding material, such as silicone rubber, is applied in an appropriate colour and in a thin layer to the recesses of the mould. Thus the recess corresponding to the fat pad may be coated with silicone rubber coloured yellow, while the recesses corresponding to the articular surface of the patella, plicae and the pes anserinus tendon may be coated with silicone rubber coloured white. If desired, fibrous material coloured red may be applied to the surface of the mould to simulate blood vessels in the internal surface of the coating. Additionally, the region of the mould corresponding to the femoral condyles may also be coated with silicone rubber coloured white. The remainder of the mould may then be coated with silicone rubber coloured pink. If desired, the recesses in the surface of the coating, arising from the recesses of the mould, may be filled with silicone rubber.

The para-condylar gutters 33 are formed between the outer surfaces of the femoral condyles and the inner wall of the coating.

The moulding material is elastomeric and, when dry, can be removed from the mould simply by peeling the silicone rubber or colloid material away from the mould giving rise to a "pouch" which is open at its lower end, but which incorporates therewithin the anatomical features of inter alia the femoral condyles and the supra-patellar pouch.

The thickness of the coating may be selected such that the coating is generally self-supporting when removed from the mould. If desired, the coating may be reinforced with a fibrous, mesh or gauze material which may be incorporated into the coating or may be applied as part of a further coating either to the pouch or, at a later stage, to the entire capsule.

The configuration and manner of manufacture of the pouch are clear from FIGS. 1 to 3 and do not require further illustration.

Figure 5:
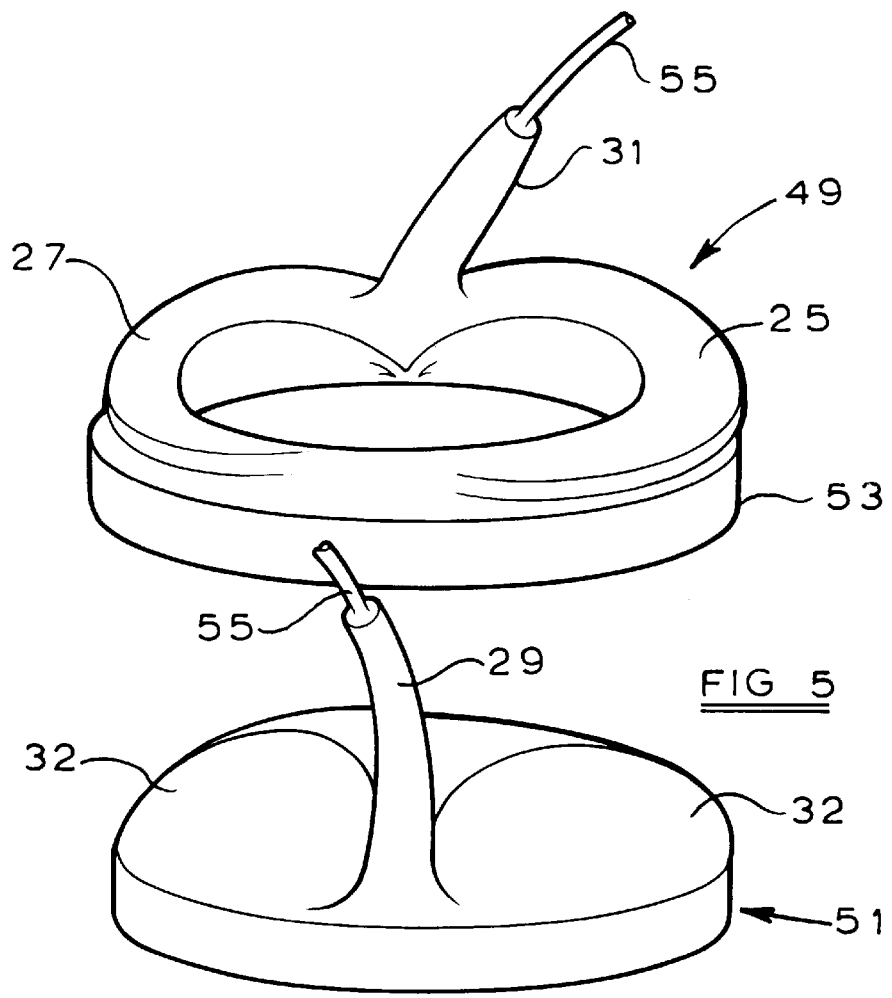
FIG. 5 is an exploded perspective view corresponding to FIG. 4.
Figure 4:
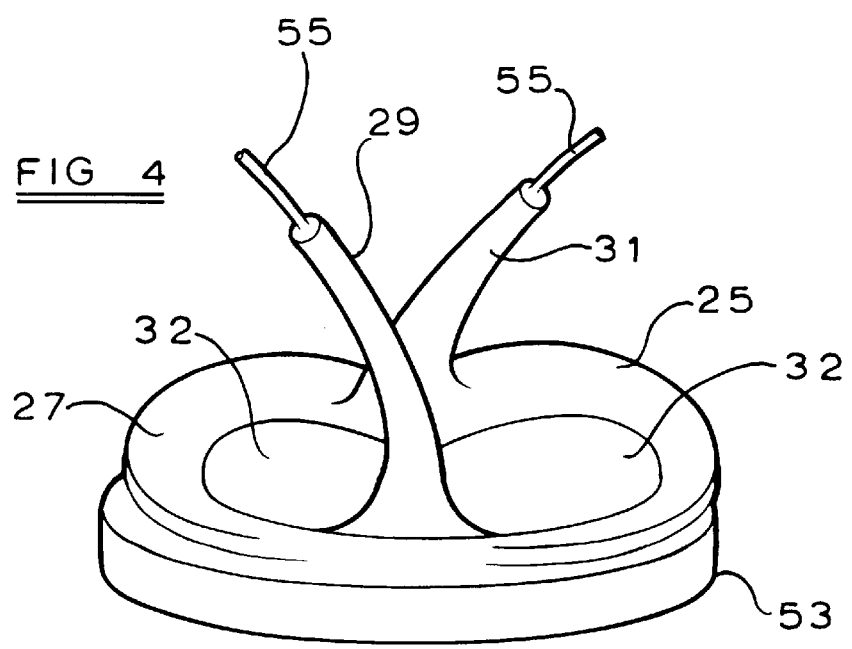
FIG. 4 is a perspective view of an assembly reproducing the anatomical features of the lower part of a knee joint.

The lower end of the pouch is closed by an assembly 47 reproducing the anatomical features of the medial and lateral menisci 25 and 27 respectively, anterior and posterior cruciate ligaments 29 and 31 respectively and the tibial articular surfaces 32. This assembly is shown in FIG. 4 and, in exploded form, in FIG. 5.

The assembly 47 is in two parts, an upper sub-assembly 49 and a lower sub-assembly 51. The upper sub-assembly 49 reproduces the medial and lateral menisci 25 and 27 respectively, together with the posterior cruciate ligament 31, while the lower sub-assembly 51 reproduces the tibial articular surfaces 32, together with the anterior cruciate ligament 29. The anterior cruciate ligament 29 of the lower sub-assembly 51 is received in a recess formed between the menisci of the upper sub-assembly 49 and the menisci are provided with a depending peripheral skirt 53 which extends around the lower sub-assembly so that the two sub-assemblies are locked together to form the assembly 47. It should be noted that the upper sub-assembly could alternatively incorporate the anterior cruciate ligament, with the lower sub-assembly incorporating the posterior cruciate ligament. Strings 55 or the like are attached by any suitable adhesive to the free ends of the cruciate ligaments 29, 31 for reasons that will be explained in more detail hereinafter. It will be noted that it is not essential for the strings 55 to be secured to the free ends of the cruciate ligaments and it may be possible to provide strings passing within the ligaments. However, it is desirable for the ligaments to retain their resilient properties.

The assembly 47 is then inserted into the open lower end of the pouch and the strings 55 are each threaded on a needle (not shown) which is inserted through the wall of the pouch, one at each side of the condylar notch to simulate the anatomical arrangement of the ligaments. The strings are secured outside the pouch, for example by means of a knot and/or with an adhesive, silicone rubber or colloid material, and any excess string is removed. The assembly 47 is then secured in position with an adhesive, silicone rubber, colloid material or the like to form the capsule 13. As noted above, the capsule may be reinforced with a fibrous, mesh or gauze material which may be applied as part of a coating to the entire capsule.

In a separate stage (not illustrated) a mould, conforming to the external shape of the model knee joint of FIGS. 1 and 2 or conforming to the external shape of the model of FIG. 3, is provided with the knee inverted and is coated internally with a material to form a skin for the model. As an alternative to coating, a separate skin may be applied to the internal surface of the mould. For example, the material may comprise a silicone rubber or colloid material which is ideally coloured to simulate skin. If desired, the skin may be reinforced with a fibrous material. The patellar complex 39 is then positioned within the mould in the appropriate position and the capsule is positioned above the patellar complex with the patellar articular surface 20 appropriately positioned relative to the patella and can be secured in position, if desired, for example with an adhesive, silicone rubber or colloid material. Packing material may be positioned around the capsule and the upper part of the mould closed with silicone rubber or colloid material. Alternatively, the mould may be filled with silicone rubber or colloid material. Where the entire knee model is being formed, the recess 5 may be formed in the base by any suitable means, such as by moulding the recess into the base or by subsequently removing material to form the recess.

We claim:

1. A surgical model in the form of a knee structure simulating certain aspects of a natural anatomical joint, the model comprising a penetrable outer skin (35) and means defining simulated joint components comprising femoral condyles (15) with a femoral notch (16) therebetween, medial and lateral menisci (25, 27), anterior and posteriors cruciate ligaments (29, 31) and tibial articular surfaces (32), wherein an impermeable penetrable capsule (13) is provided within the skin and penetrable packing material (37) is provided around the capsule between the capsule and the skin, the capsule (13) being formed with internal protrusions corresponding to the femoral condyles (15) with the femoral notch (16) therebetween and corresponding to the tibial articular surfaces (32).

2. A surgical model as claimed in claim 1, wherein the model is provided with a generally flat base.

3. A surgical model as claimed in claim 2, wherein the base of the model is formed with a recess (5) for engaging with a complementary protrusion formed on a receiving tray (7).

4. A surgical model as claimed in claim 1, wherein the model includes a simulated patellar complex (39) intermediate the capsule (13) and the skin (35).

5. A surgical model as claimed in claim 4, wherein the patellar complex (39) incorporates a simulated patella (41) and a simulated patellar tendon (43).

6. A surgical model as claimed in claim 4, wherein the patellar complex (39) is made of a harder material than the skin (35) and the capsule (13).

7. A surgical model as claimed in claim 1, wherein the components simulating the femoral condyles (15) with the femoral notch (16) therebetween are formed integrally with the capsule (13).

8. A surgical model as claimed in claim 7, wherein the components simulating the femoral condyles (15) with the femoral notch (16) therebetween are formed in the capsule wall.

9. A surgical model as claimed in claim 1, wherein components simulating at least one of an articular surface (20) of a patella, plicae (21), a pes anserinus tendon (23) and a fat pad (19) are formed integrally with the capsule (13).

10. A surgical model as claimed in claim 1, wherein the components simulating the medial and lateral menisci (25, 27), the anterior and posterior cruciate ligaments (29, 31) and the tibial articular surfaces (32) are formed as a separate assembly to the remainder of the capsule (13).

11. A surgical model as claimed in claim 10, wherein the medial and lateral menisci (25, 27) are formed as a first sub-assembly (49) with one of the posterior and anterior cruciate ligaments (29, 31), and the tibial articular surfaces (32) are formed as a second sub-assembly (51) with the other of the posterior and anterior cruciate ligaments (29, 31).

12. A surgical model as claimed in claim 11, wherein the sub-assemblies (49, 51) are interconnected by providing the first sub-assembly (49) with a skirt (53) which extends around the periphery of the second sub-assembly (51).

13. A surgical model as claimed in claim 12, wherein the second sub-assembly (51) is provided with a recess for receiving the cruciate ligament (29) of the first sub-assembly (49).

14. A surgical model as claimed in claim 10, wherein free ends of the ligaments (29, 31) are secured to the capsule (13) within the femoral notch (16).

15. A surgical model as claimed in claim 1, wherein the capsule (13) is filled with a fluid.

16. A surgical model as claimed in claim 15 wherein the fluid is pressurised.

17. A surgical model as claimed in claim 1, wherein the skin (35) of the model and the capsule (13) are formed of a material selected from an elastomer and a colloid.

18. A surgical model as claimed in claim 1, wherein the packing material (37) is selected from light discrete particulate material, a moulded light material and the same material as the remainder of the model.

19. A surgical model as claimed in claim 1, wherein at least one of the capsule (13) and the skin (35) incorporates a reinforcing material.

20. A surgical model as claimed in claim 1, wherein the model is configured to be received in a cradle (11), which cradle is provided with a generally flat base.

21. A surgical model as claimed in claim 20, wherein the base of the cradle (11) is formed with a recess (5) for engaging with a complementary protrusion formed on a receiving tray (7).

22. A surgical model as claimed in claim 5, wherein the patellar complex (39) additionally incorporates a simulated tibial tubercle (45).

23. A surgical model as claimed in claim 15, wherein the fluid is selected from water and saline.

24. A surgical model as claimed in claim 19, wherein the reinforcing material is selected from fibrous, mesh and gauze material.

25. A surgical model as claimed in claim 1, wherein the capsule (13) is a least partly surrounded internally of the model by a reinforcing material.

26. A surgical model as claimed in claim 25, wherein the reinforcing material is selected from fibrous, mesh and gauze material.

* * * * *